United States Patent [19]
Daniel et al.

[11] Patent Number: 5,945,495
[45] Date of Patent: *Aug. 31, 1999

[54] USE OF SURFACTANTS IN THE DRYING OF HYDROPHILIC HIGHLY SWELLABLE HYDROGELS

[75] Inventors: Thomas Daniel, Chesapeake, Va.; Norbert Herfert, Altenstadt, Germany; Gustav Remmel, Gelnhausen, Germany; Ulrich Riegel, Frankfurt am Main, Germany; Uwe Stüven, Bad Soden, Germany; Fritz Engelhardt, Chesapeake, Va.

[73] Assignee: BASF Corporation, Mount Olive, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/785,723

[22] Filed: Jan. 17, 1997

[30] Foreign Application Priority Data

Jan. 19, 1996 [DE] Germany ................ 196 01 763

[51] Int. Cl.$^6$ ...................... C08F 20/06
[52] U.S. Cl. .............. 526/317.1; 526/274; 526/286; 526/288; 526/312
[58] Field of Search .............. 526/317.1, 274, 526/286, 288, 312

[56] References Cited

U.S. PATENT DOCUMENTS

| | | |
|---|---|---|
| 4,057,521 | 11/1977 | Gross . |
| 4,062,817 | 12/1977 | Westerman . |
| 4,076,663 | 2/1978 | Masuda et al. . |
| 4,286,082 | 8/1981 | Tsubakimoto et al. . |
| 4,295,987 | 10/1981 | Parks . |
| 4,340,706 | 7/1982 | Obayashi et al. . |
| 4,367,323 | 1/1983 | Kitamura et al. ............ 526/317.1 |
| 4,459,396 | 7/1984 | Yamasaki et al. . |
| 4,525,527 | 6/1985 | Takeda et al. . |
| 4,535,098 | 8/1985 | Evani et al. . |
| 4,692,502 | 9/1987 | Uebele et al. ............ 526/317.1 |
| 4,833,222 | 5/1989 | Siddall et al. . |
| 4,914,170 | 4/1990 | Chang et al. . |
| 4,931,497 | 6/1990 | Engelhardt et al. . |
| 4,959,441 | 9/1990 | Engelhardt et al. . |
| 5,011,892 | 4/1991 | Engelhardt et al. . |
| 5,015,711 | 5/1991 | Simonet et al. ............ 526/317.1 |
| 5,041,496 | 8/1991 | Engelhardt et al. . |
| 5,066,745 | 11/1991 | Engelhardt et al. . |
| 5,086,133 | 2/1992 | Itoh et al. . |
| 5,116,924 | 5/1992 | Bung et al. ............ 526/317.1 |
| 5,149,750 | 9/1992 | Niessner et al. ............ 526/317.1 |
| 5,202,400 | 4/1993 | Itoh et al. ............ 526/317.1 |
| 5,229,466 | 7/1993 | Brehm et al. ............ 526/317.1 |
| 5,258,473 | 11/1993 | Niessner et al. ............ 526/317.1 |
| 5,304,906 | 4/1994 | Arita et al. . |
| 5,331,059 | 7/1994 | Engelhardt et al. . |
| 5,380,808 | 1/1995 | Sumiya et al. . |
| 5,548,047 | 8/1996 | Ito et al. ............ 526/317.1 |
| 5,633,316 | 5/1997 | Gartner et al. . |

FOREIGN PATENT DOCUMENTS

| | | |
|---|---|---|
| A1 2119967 | 9/1994 | Canada . |
| A 280 541 | 8/1988 | European Pat. Off. . |
| A2 0 280 541 | 8/1988 | European Pat. Off. . |
| A 312 952 | 4/1989 | European Pat. Off. . |
| B1 0 312 952 | 4/1989 | European Pat. Off. . |
| B1 0 376 118 | 7/1990 | European Pat. Off. . |
| A 464 211 | 1/1992 | European Pat. Off. . |
| A 509 708 | 10/1992 | European Pat. Off. . |
| A1 0 509 708 | 10/1992 | European Pat. Off. . |
| C 1 301 566 | 1/1968 | Germany . |
| 56-93716 | 7/1981 | Japan ............ 526/317.1 |
| 5155950 | 6/1993 | Japan ............ 526/317.1 |
| 0825545 | 5/1981 | U.S.S.R. ............ 526/317.1 |
| 1147852 | 4/1969 | United Kingdom . |
| 1208984 | 10/1970 | United Kingdom . |

OTHER PUBLICATIONS

Trijasson, Pith, Lambla, "Hydrophilic Polyelectrolyte Gels By Inverse Suspension", Makromol. Chem., Makromol. Symp. 35/36, 141–169 (1990).

XP–002053523, "Release agent for use in drying acrylamide polymers", Sep. 10, 1981.

Patent Abstracts of Japan, vol. 004, No. 026 (C–001), Mar. 6, 1980 & JP 55 003432 A.

Patent Abstracts of Japan, vol. 009, No. 012 (C–261), Jan. 18, 1985 & JP 59 163427 A.

Patent Abstracts of Japan, vol. 004, No. 155 (C–029), Oct. 29, 1980 & JP 55 102612 A.

William C. Griffin, "Calculation of HLB values of Non-–Ionic Surfactants", Journal of Society of Cosmetic Chemists, vol. V, No. 4, Dec. 1954.

Hawley's Condensed Chemical Dictionary 1991 Sax et al p. 1081.

Primary Examiner—Bernard Lipman
Assistant Examiner—N. Sarofim
Attorney, Agent, or Firm—Susan S. Jackson; David T. Banchik

[57] ABSTRACT

The present invention relates to the use of surfactants for improving the drying properties of hydrophilic, highly swellable hydrogels in the course of drying with the aid of contact dryers.

13 Claims, No Drawings

USE OF SURFACTANTS IN THE DRYING OF HYDROPHILIC HIGHLY SWELLABLE HYDROGELS

The present invention relates to the use of surfactants for improving the drying properties of hydrophilic highly swellable hydrogels in the course of drying with the aid of contact dryers.

Hydrophilic highly swellable hydrogels are especially polymers of (co)polymerized hydrophilic monomers, graft (co)polymers of one or more hydrophilic monomers on an appropriate graft base, crosslinked cellulose ethers or starch ethers, or natural products, such as guar derivatives, for example, which can be swollen in aqueous liquids.

Synthetic products of this kind can be prepared by known polymerization techniques from suitable hydrophilic monomers, for example acrylic acid. Polymerization in aqueous solution by the technique known as gel polymerization is preferred. It produces polymers in the form of aqueous jellies which, following mechanical comminution with appropriate apparatus, are obtained in solid form by means of known drying techniques.

A particularly preferred drying technique, especially for polymer gels which contain starch or, generally, which contain natural substances, is that of drum drying, which permits rapid drying without detriment to the product. In this technique, the mechanically comminuted polymer gel is fed through parallel nozzles onto a rotating drum and is spread using an applicator roll, by exertion of pressure, onto the surface of the drum, so as to form a gel film of maximum homogeneity. In the course of one rotation of the drum the gel film is dried and is parted from the surface of the drum with the aid of a fixed blade. The surface temperature of the drum can be from 100 to 250° C., particularly preferably from 140° C. to 220° C., while its speed of rotation is from 0.1 to 5 rpm, particularly preferably from 0.2 to 1 rpm. The surface temperature and speed of rotation of the drum are to be harmonized such that the product to be dried exhibits the desired degree of drying, i.e. the desired residual moisture content, when after almost one rotation it reaches the fixed blade.

The abovementioned advantages of the technique of drum drying of the polymer gels have nevertheless to date been accompanied in practice by disadvantages as well. For instance, conveying the polymer gel through the pipeline system which leads to the applicator nozzles, and pressing the polymer gel out through the applicator nozzles, require high pressures, which lead to mechanical problems. Furthermore, through the pressure effect of the applicator roll it is possible to form a homogeneous gel film only when the solids concentration of the gel is low, i.e below 20% by weight. At higher solids concentrations, the polymer gel no longer forms a homogeneous gel film but instead forms a film of varying thickness, the thicker areas always being at the level of the nozzles which apply the polymer gel. The drum dryer must then be set so that the thickest areas of the gel film are dried adequately, with the result that in this case the capacity of the dryer is not fully utilized. This is undesirable from an economic standpoint.

It is the object of the present invention, therefore, to provide a process which does not have these disadvantages and which, in particular, enables the capacity of the drum dryer to be utilized to a greater extent even when the polymer gel to be dried has a high solids content.

It has susprisingly now been found that the presence of surfactants in the polymer gel to be dried achieves the set object.

In connection with the synthesis and further processing of super-absorbents, certain technical effects are already obtained using surfactants. For example, EP-A 280 541 makes use of a surfactant having an HLB of 7 or more with the aim of obtaining a polymer of enhanced absorption rate and improved gel blocking properties. The dried polymer is said at the same time to be easier to comminute/fractionate at the finishing stage.

U.S. Pat. No. 5,380,808 describes the use of anionic and nonionic surfactants for avoiding or reducing the clumping of the individual polymer particles.

EP-A 509 708 describes the use of nonionic surfactants with an HLB of 3–10 in the course of surface aftercrosslinking or surface treatment of the hydrogel particles.

U.S. Pat. No. 4,914,170 teaches the addition of anionic and nonionic surfactants to the monomer solution prior to polymerization so as to ensure improved distribution of comonomers, especially hydrophobic comonomers. At the same time this achieves better wetting of the dryer surfaces when solutions of this kind are placed onto drum dryers or belt dryers. It also improves the detachment of the partially dried polymers from the surfaces of the dryer.

The use of ionic surfactants is likewise mentioned in U.S. Pat. No. 4,535,098, which describes the copolymerization of water-soluble and hydrophobic, water-insoluble monomers in aqueous phase. In this case the function of the surfactants is to form micelles, in order to provide a very substantially homogeneous monomer solution for polymerization.

A large number of references, such as Makromol. Chem., Makromol. Symp. 35/36 (1990) 141–169 and Plast. Massy 1 (1990) 16–18 (USSR), and also Patents, for example U.S. Pat. No. 4,459,396, EP-A 464 211 and U.S. Pat. No. 5,331,059, describe the preparation of hydrogels by inverse suspension polymerization. This polymerization technique requires the use of a surfactant as dispersant to stabilize the inverse dispersion and to establish the droplet size.

EP-A 312 952 also describes the use of surfactants in the aqueous-phase gel polymerization of partially neutralized alpha,beta-ethylenically unsaturated carboxylic acid monomers, but the surfactant here only has the function of a dispersant, i.e. its use provides for a stable dispersion of the crosslinking agent and the comonomers following neutralization.

U.S. Pat. No. 4,286,082 describes the positive effect of surfactants in aqueous polymer gels based on acrylic acid in terms of improving the tackiness of the gels and in reducing their adhesion to metallic surfaces of polymerization vessel, comminution apparatus, screws, blades, perforated plates, etc.

EP-A 376 118 describes the use of surfactants in the preparation of water-swellable copolymer gels, where up to 50% of the amount of surfactant can be added to the monomer solution prior to polymerization with the remainder being added to the reaction mixture after a polymerization conversion of at least 60%, but in any case always before polymerization conversion is complete. The aim of this method is to obtain finely divided, crumblike polymer particles which do not clump together. Consequently, the prior art does not provide the skilled worker with the teaching to employed surfactants in order to improve the drying properties of polymer gels.

The present invention provides, accordingly, for the use of surfactants for improving the drying properties of hydrophilic highly swellable hydrogels in the course of drying with the aid of contact dryers.

In the context of the present invention, drying properties denote in particular the pumpability of the polymer gel through the pipeline system leading to the dryer, and onto the contact dryer, and the spreadability of the polymer gel on the surface of the dryer.

The term contact dryers refers in the context of the present invention in particular to drum dryers as are known to the skilled worker.

Drying is preferably carried out at contact-surface temperatures of at least 120° C., particularly preferably at least 150° C. and, with very particular preference, at least 180° C.

In accordance with the invention it is possible to use all nonionic, anionic, cationic or amphoteric surfactants, preference being given to those which are soluble or at least dispersible in water. The HLB value of the surfactants is therefore preferably greater than or equal to three (For a definition of HLB see W. C. Griffin, J. Soc. Cosmetic Chem. 5 (1954) 249).

Examples of suitable nonionic surfactants are the adducts of ethylene oxide, propylene oxide or ethylene oxide/propylene oxide mixtures with alkylphenols, aliphatic alcohols, carboxylic acids or amines. Suitable examples are ($C_8$–$C_{24}$)-alkylphenols alkoxylated with ethylene oxide and/or propylene oxide. Examples of commercial products of this kind are octylphenols or nonylphenols each of which is reacted with from 4 to 20 mol of ethylene oxide per mole of phenol. Other suitable nonionic surfactants are ethoxylated ($C_{10}$–$C_{24}$) fatty alcohols, ethoxylated ($C_{10}$–$C_{24}$) fatty acids, and ethoxylated ($C_{10}$–$C_{24}$) fatty amines and ethoxylated ($C_{10}$–$C_{24}$) fatty acid amides. Also suitable are polyhydric ($C_3$–$C_6$)-alcohols esterified partially with ($C_{10}$–$C_{24}$) fatty acids. These esters can additionally be reacted with from 2 to 20 mol of ethylene oxide. Examples of suitable fatty alcohols which are alkoxylated to prepare the surfactants are palmityl alcohol, stearyl alcohol, myristyl alcohol, lauryl alcohol, oxo alcohols, and also unsaturated alcohols, such as oleyl alcohol. In this context, the degree of ethoxylation or propoxylation, or of reaction with ethylene oxide and propylene oxide, is such that the reaction products are soluble in water. In general, 1 mol of the abovementioned fatty alcohols is reacted with from 2 to 20 mol of ethylene oxide and, if used, with up to 5 mol of propylene oxide in such a way as to give surfactants having an HLB value of more than 8. Examples of ($C_3$–$C_6$)-alcohols, which are partially esterified and, if desired, ethoxylated, are glycerol, sorbitol, mannitol and pentaerythritol. These polyhydric alcohols are partially esterified with ($C_{10}$–$C_{24}$) fatty acids, for example oleic acid, stearic acid or palmitic acid. Esterification with the fatty acids goes only so far as to leave at least one OH group of the polyhydric alcohol unesterified. Examples of suitable esterification products are sorbitan monooleate, sorbitan tristearate, mannitol monooleate, glycerol monooleate and glycerol dioleate. The abovementioned fatty acid esters of polyhydric alcohols which still contain at least one free OH group can be reacted further, for modification purposes, with ethylene oxide, propylene oxide or mixtures of ethylene oxide and propylene oxide. For each mole of fatty acid ester it is preferred to use from 2 to 20 mol of the alkylene oxides mentioned. The degree of ethoxylation is known to have an influence on the HLB value of the nonionic surfactants. By an appropriate choice of alkoxylating agents and the amount thereof, it is possible in a technically simple manner to prepare surfactants having HLB values in the range from 3 to 20.

Another group of suitable surfactants comprises homopolymers of ethylene oxide, block copolymers of ethylene oxide and alkylene oxides, preferably propylene oxide, and also polyfunctional block copolymers which are formed, for example by sequential addition of propylene oxide and ethylene oxide onto diamines.

Also suitable are alkylpolyglycosides as marketed, for example, under the trade names ®APG, ®Glucopan and ®Plantaren.

The nonionic surfactants can be used either alone or else in a mixture with one another.

Suitable anionic surfactants are ($C_8$–$C_{24}$)-alkylsulfonates, which are preferably employed in the form of the alkali metal salts, ($C_8$–$C_{24}$)-alkyl sulfates, which are preferably employed in the form of the alkali metal or trialkanolammonium salts, such as, for example, triethanolammonium lauryl sulfate, sulfosuccinic diesters, for example the sodium salt of di(2-ethylhexyl) sulfosuccinate, sulfosuccinic monoesters, for example sodium lauryl sulfosuccinate, or disodium fatty alcohol polyglycol ether sulfosuccinate, ($C_8$–$C_{24}$)-alkylarylsulfonic acids, and the sulfuric acid half-esters of adducts of ethylene oxide with alkylphenols or fatty alcohols.

Examples of suitable cationic surfactants are the salts of fatty amines, for example coconut-fatty ammonium acetate, quaternary fatty acid amino esters, for example di-fatty acid isopropyl ester dimethylammonium methosulfate, quaternary fatty acid aminoamides, for example N-undecylene acid propylamido-N-trimethylmmonium methosulfate, adducts of alkylene oxides with fatty amines or salts of fatty amines, such as pentaoxethylstearylammonium acetate or ethoxylated methyl-oleamine methosulfate, and also long-chain alkylbenzyldimethylammonium compounds, such as ($C_{10}$–$C_{22}$)-alkyl-benzyldimethylammonium chloride.

Examples of suitable amphoteric surfactants are, in particular, compounds which in the same molecule carry at least one quaternary ammonium cation and at least one carboxylate or sulfate anion, such as, for example, dimethylcarboxymethyl-fatty acid alkylamidoammonium betaines or 3-(3-fatty acid amido-propyl) dimethylammonium 2-hydroxypropanesulfonates.

The ionic surfactants can be used alone or else in a mixture with one another.

Preference is given to the nonionic surfactants, especially to the polyhydric ($C_3$–$C_6$)-alcohols esterified partially with ($C_{10}$–$C_{24}$) fatty acids, which are reacted with from 2 to 20 mol of ethylene oxide; very special preference is given to the abovementioned esterification products which are not reacted with ethylene oxide.

The surfactants are preferably employed in amounts of from 0.01 to 5% by weight, particularly preferably from 0.02 to 2% by weight, based on the solids content of the polymer gel to be dried. The use of nonionic or anionic surfactants in this context is preferred, and that of nonionic surfactants is particularly preferred.

The surfactant can be introduced in various ways into the polymer gel which is to be dried. For one, the surfactant can be mixed directly into the monomer solution which is to be polymerized, so that after polymerization the surfactant is already present in the polymer gel. Another option is to mix the surfactant, in the form of an aqueous solution or dispersion, into the already polymerized hydrogel during its comminution, by means of appropriate apparatus, for example a mincer. In this case, the surfactant solution or dispersion can also be employed in combination with other components for afterteating the already polymerized hydrogel. For instance, the surfactant solution or dispersion can be employed together with sodium hydroxide solution, for after-neutralization of the hydrogel, or with a crosslinker solution, for additional crosslinking of the hydrogel.

In a preferred embodiment of the present invention, the surfactant solution or dispersion is added to the polymer gel together with hydrophilic highly swellable hydrogel which is to be recycled and has a particle size of less than or equal to 0.15 mm (referred to as fine grain). Here, the addition of surfactant not only brings about an improvement in the drying of the polymer gel but also reduces, very effectively, the tendency of the fine grain towards gel blocking, thereby facilitating the incorporation of the fine grain into the polymer gel.

Suitable hydrophilic highly swellable hydrogels whose drying properties can be improved in accordance with the invention are, in particular, polymers comprising (co) polymerized hydrophilic monomers, graft(co)polymers of one or more hydrophilic monomers on an appropriate graft base, crosslinked cellulose ethers or starch ethers, or natural products, for example guar derivatives, which can be swollen in aqueous liquids, and which may be in chemically modified form. These hydrogels are known to the skilled worker.

Also suitable are mixtures of synthetic and naturally occurring (co)polymers which can also be linked to one another chemically.

Examples of hydrophilic monomers suitable for preparing these hydrophilic highly swellable polymers are polymerizable acids, such as acrylic acid, methacrylic acid, vinylsulfonic acid, vinylphosphonic acid, maleic acid (including its anhydride), fumaric acid, itaconic acid, 2-acrylamido-2-methylpropanesulfonic acid, 2-acrylamido-2-methylpropanephosphonic acid, and the amides thereof, hydroxyalkyl esters, and amino- or ammonium group-containing esters and amides, and also water-soluble N-vinylamides or diallyldimethylammonium chloride.

Preferred hydrophilic monomers are compounds of the formula I

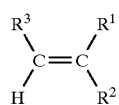

(I)

in which
$R^1$ is hydrogen, methyl or ethyl,
$R^2$ is the group —COOR$^4$, sulfonyl, phosphonyl, $(C_1-C_4)$-alkanol-esterified phosphonyl, or a group of the formula

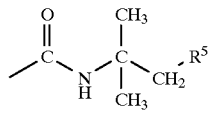

$R^3$ is hydrogen, methyl, ethyl or carboxyl,
$R^4$ is hydrogen, amino or hydroxy-$(C_1-C_4)$-alkyl, and
$R^5$ is sulfonyl, phosphonyl or carboxyl.

Examples of $(C_1-C_4)$-alkanols are methanol, ethanol, n-propanol and n-butanol.

Particularly preferred hydrophilic monomers are acrylic acid and methacrylic acid.

Hydrophilic hydrogels which can be obtained by polymerizing olefinically unsaturated compounds are already known and are described in, for example, U.S. Pat. No. 4,057,521, U.S. Pat. No. 4,062,817, U.S. Pat. No. 4,525,527, U.S. Pat. No. 4,286,082, U.S. Pat. No. 4,340,706 and U.S. Pat. No. 4,295,987.

Moreover, hydrophilic hydrogels which are obtainable by graft copolymerization of olefinically unsaturated acids onto various matrices, for example polysaccharides, polyalkylene oxides and derivatives thereof, are also already known and are described in, for example, U.S. Pat. No. 5,011,892, U.S. Pat. No. 4,076,663 or U.S. Pat. No. 4,931,497. Suitable graft bases may be natural or synthetic in origin. Examples are starch, cellulose or cellulose derivatives, and other polysaccharides and oligosaccharides, polyalkylene oxides, especially polyethylene oxides and polypropylene oxides, and hydrophilic polyesters.

Suitable polyalkylene oxides, for example, have the formula

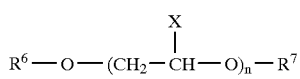

in which
$R^6$ and $R^7$ independently of one another are hydrogen, alkyl, alkenyl or aryl,
X is hydrogen or methyl, and
n is an integer from 1 to 10 000.

$R^6$ and $R^7$ are preferably hydrogen, $(C_1-C_4)$-alkyl, $(C_2-C_6)$-alkenyl or phenyl. Particularly preferred hydrogels are polyacrylates, polymethacrylates and the graft copolymers described in U.S. Pat. No. 4,931,497, U.S. Pat. No. 5,011,892 and U.S. Pat. No. 5,041,496. The content of these patent documents is expressly part of the present disclosure as well.

The hydrophilic highly swellable hydrogels whose drying properties can be improved in accordance with the invention are preferably crosslinked, i.e. they include compounds having at least two double bonds, which are incorporated by polymerization into the polymer network.

Particularly suitable crosslinkers are methylenebisacrylamide and methylenebismethacrylamide, esters of unsaturated mono- or polycarboxylic acids with polyols, such as diacrylate or triacrylate, for example butanediol or ethylene glycol diacrylate or dimethacrylate, and trimethylolpropane triacrylate and allyl compounds, such as allyl(meth)acrylate, triallyl cyanurate, diallyl maleate, polyallyl esters, tetraallyloxyethane, triallylamine, tetraallylethylenediamine, allyl esters of phosphoric acid, and also vinylphosphonic acid derivatives as are described, for example, in EP-A 343 427.

The content of EP-A 343 427 is expressly part of the present disclosure as well.

Furthermore, the hydrophilic highly swellable hydrogels whose drying properties can be improved in accordance with the invention are, with particular preference, after-crosslinked in the aqueous gel phase in a manner known per se.

The hydrophilic highly swellable hydrogels whose drying properties can be improved in accordance with the invention can be prepared by polymerization techniques known per se. Preference is given to polymerization in aqueous solution by the technique known as gel polymerization. In this case from 15 to 50% by weight aqueous solutions of one or more hydrophilic monomers and, if desired, an appropriate graft base are polymerized in the presence of a free-radical initiator, preferably without mechanical mixing, with utilization of the Trommdorff-Norrish effect (Bios Final Rep. 363.22; Makromol. Chem. 1 (1947) 169.

The polymerization reaction can be carried out within the temperature range between 0° C. and 150° C., preferably between 10° C. and 100° C., and under atmospheric pressure or else under elevated or reduced pressure. As is customary, the polymerization can also be conducted in an inert-gas atmosphere, preferably under nitrogen.

Polymerization can be initiated using high-energy electromagnetic rays or the customary chemical polymerization initiators, examples being organic peroxides, such as benzoyl peroxide, tert-butyl hydroperoxide, methyl ethyl ketone peroxide, cumene hydroperoxide, azo compounds such as azodiisobutyronitrile, and inorganic peroxy compounds, such as $(NH_4)_2S_2O_8$ or $K_2S_2O_8$ or $H2O_2$, alone or in combination with reducing agents such as sodium hydrogen sulfite, and iron(II) sulfate, or redox systems whose reducing component comprises an aliphatic or aromatic sulfinic acid, such as benzenesulfinic acid and toluenesulfinic acid and derivatives of these acids, such as, for example, Mannich adducts of sulfinic acid, aldehydes and amino compounds, as are described in DE-C 1 301 566.

By subsequently heating the polymer gels in the temperature range from 50 to 130° C., preferably from 70 to 100° C., for a number of hours it is possible to improve still further the quality properties of the polymers.

Through the use of surfactants in accordance with the invention it is possible to dry hydrogels with a solids content of at least 50% by weight.

The invention is illustrated by the Examples which follow.

COMPARISON EXAMPLE I

This Example uses a pipeline system constructed to transport the polymer gel to a drum dryer. The polymer gel is transported with the aid of a pump which can develop a maximum pipeline pressure of 30 bar. At a pump pressure of 25 bar, this pipeline system is used to transport a mechanically comminuted polymer gel with a solids content of 20–25% by weight and a water content of 75–80% by weight. In its dry, granular form, this polymer gel has the following typical properties:

| | |
|---|---|
| Free Swell Capacity | 50–60 g/g |
| Gel strength (shear modulus) | 800–1500 Pa |
| Starch content | 0–5% by weight |
| pH | 5.9–6.4 |

The rate of conveyance of the polymer gel under the conditions chosen here is 1000 kg/h.

EXAMPLE I

The procedure of Comparison Example I was adopted but, before being transported through the pipeline system, various amounts of different surfactants in the form of aqueous solutions or dispersions (see Table I) were added to the polymer gel. The rate of conveyance of the surfactant-containing polymer gels was kept constant and, as in Comparison Example I, was 1000 kg/h. The pump pressure required to achieve this rate of conveyance was measured and is listed in Table I. From these data it is evident that owing to the addition of the surfactants to the polymer gel, a lower pump pressure is required to convey the gels than for the surfactant-free polymer gel (Comparison Example I).

TABLE I

| Surfactant added to the polymer gel | % by weight of surfactant based on solids content of polymer gel | Pump pressure for a rate of conveyance of 1 000 kg of gel/h |
|---|---|---|
| Tween ® 80 | 0.5% by weight | 20 bar |
| SPAN ® 20 | 0.3% by weight | 18 bar |
| Hostapur ® SAS 30 | 0.3% by weight | 21 bar |
| Sodium salt of di(2-ethylhexyl) sulfosuccinate | 0.4% by weight | 19 bar |
| $C_{12}$-/$C_{14}$-alkylbenzyl-dimethylammonium chloride | 0.4% by weight | 22 bar |
| Ampholyt ® JB 130/K | 0.2% by weight | 23 bar |

Tween ® 80 (commercial product of ICI) is polyethylene oxide-(20) sorbitan monooleate
SPAN ® 20 (commercial product of ICI) is sorbitan monolaurate
Hostapur ® SAS 30 (commercial product of Hoechst AG) is a mixture of n-alkanesulfonates prepared by sulfoxidation of n-paraffins
Ampholyt ® JB 130/K (commercial product of Huls AG) is a cocamidopropyl betaine

COMPARISON EXAMPLE II 800 parts of acrylic acid are diluted with 800 parts of water, and are reacted with 644.38 parts of 25% strength sodium hydroxide solution, with ice cooling. This reaction mixture is placed, together with 4 parts of methylenebisacrylamide, 300 parts of an 8% by weight aqueous solution of oxidized starch, and 1616.22 parts of water, into an unheated and insulated reactor. Nitrogen is blown through the solution, and the temperature of the solution is lowered to 10° C. When the content of oxygen dissolved in the solution is below 1 ppm, the following initiators are added in the sequence stated:

0.8 part of 2,2-azobisamidinopropane dihydrochloride in 10 parts of water 0.008 part of ascorbic acid 0.23 part of a 35% by weight aqueous hydrogen peroxide solution.

After an induction phase of 20 minutes, polymerization begins and a maximum temperature of 60° C. is reached over the course of 2 hours. The gel thus obtained is left in the insulated reactor for 2 hours more, thereby reducing the residual monomer content of acrylic acid in the gel to below 1000 ppm. After the polymer gel has been comminuted in a mincer, 644.38 parts of a 50% by weight sodium hydroxide solution are added to the gel. Before adding the sodium hydroxide solution, the temperature of the gel is approximately 60° C. and the temperature of the sodium hydroxide solution is 38° C. The gel is passed through the mincer again in order to ensure good mixing of the gel with the sodium hydroxide solution, and thus homogeneous neutralization of the gel. To this gel, which owing to the exothermic neutralization reaction now has a temperature of 75–80° C., there is added 0.8 part of ethylene glycol diglycidyl ether. The gel is subsequently passed three times more through the mincer in order to distribute the post-crosslinker homogeneously in the gel.

The mechanically comminuted polymer gel prepared in this way is conveyed in the pipeline system used in Comparison Example I. In this case, a pump pressure of 27 bar establishes a rate of conveyance of 1200 kg/h.

EXAMPLE II

A polymer gel was prepared in analogy to Comparison Example II, but the amounts of surfactant indicated in Table II were added to the aqueous monomer solution. The mechanically comminuted polymer gels prepared in this way were conveyed, in analogy to Comparison Example II, in the pipeline system at a rate of 1200 kg/h; the pump pressure established in this case is indicated in Table II. From the data it is evident that the addition of surfactant to the monomer solution which is to be polymerized improves the pumpability of the polymer gel.

TABLE II

| Surfactant added to the monomer solution | % by weight of surfactant based on monomer solution | Pump pressure for a rate of conveyance of 1 000 kg gel/h |
| --- | --- | --- |
| Genagen ® CA-050 | 0.46% | 23 bar |
| Plantaren ® 2 000 UPNP | 0.58% | 20 bar |
| Tween ® 20 | 0.35% | 22 bar |
| Hostapur ® SAS 30 | 0.35% | 22 bar |
| Disodium salt of ricinoleic acid monoethanolamido-sulfosuccinate | 0.58% | 19 bar |
| DSIE adduct | 0.81% | 25 bar |

Genagen ® CA-050 (commercial product of Hoechst AG) is a coconut-fatty acid monoethanolamide polyglycol ether
Plantaren ® 2 000 UPNP (commercial product of Henkel KGaA) is an alkylpolyglycoside
Tween ® 20 (commercial product of ICI) is polyethylene oxide-(20) sorbitol monolaurate
DSIE adduct is the reaction product of distearylimidazoline ester with lactic acid DSIE adduct is the reaction product of distearylimidazoline ester with lactic acid

EXAMPLE III

A polymer gel is prepared in analogy to Comparison Example II except that the amounts of surfactant indicated in Table III were added to the mechanically comminuted gel together with the 50% by weight solution of NaOH in water. The polymer gel prepared in this way was conveyed in the pipeline system at a rate of 1200 kg/h in analogy to Comparison Example II. The pump pressure required to do this is indicated in Table III. From the data it is evident that the addition of surfactant improves the pumpability of the gel.

TABLE III

| Surfactant to which the as yet unneutralized polymer gel has been added | % by weight of surfactant based on polymer gel | Pump pressure for a rate of conveyance of 1 200 kg gel/h |
| --- | --- | --- |
| Tween ® 21 | 0.52% | 21 bar |
| Hostapur ® SAS 30 | 0.35% | 22 bar |
| Sodium lauryl sulfate | 0.46% | 20 bar |
| Ampholyt ® JB 130/K | 0.93% | 24 bar |

Tween ® 21 (commercial product of ICI) is polyethylene oxide-(4) sorbitan monolaurate

EXAMPLE IV

A polymer gel was prepared in analogy to Comparison Example II except that the amounts of surfactant indicated in Table IV were added to the gel together with the solution of aftercrosslinker. The polymer gel thus prepared was conveyed in the pipeline system at a rate of 1200 kg/h in analogy to Comparison Example II; the pump pressure required for this is indicated in Table IV. From the data it is evident that the addition of surfactant improves the pumpability of the gel.

TABLE IV

| Surfactant added to the polymer gel after neutralization but before crosslinking | % by weight of surfactant based on polymer gel | Pump pressure for a rate of conveyance of 1 200 kg gel/h |
| --- | --- | --- |
| SPAN ® 20 | 0.3% | 21 bar |
| Genapol ® 2 822 | 0.6% | 23 bar |
| Plantaren ® 2 000 UPNP | 0.5% | 22 bar |
| Sodium lauryl sulfate | 0.4% | 20 bar |
| $C_{12}$-/$C_{14}$-alkylbenzy-dimethyl-ammonium chloride | 0.7% | 25 bar |

Genapol ® 2 822 (commercial product of Hoechst AG) is a nonionic fatty alcohol-ethylene oxide/propylene oxide adduct

EXAMPLE V

This Example examines the effect of adding surfactant on the spreadability of the polymer gel.

30 g of the polymer gel of Comparison Example I are placed in a press and the gel is subjected to a pressure of 2 bar for 15 seconds. This allows the gel to be pressed out to form a film whose superficial extent is put at 1.0.

The press experiments are repeated. This time, however, the amounts of surfactant indicated in Table V are added to the polymer gel before the pressing operation. The superficial extent of the resulting gel films is indicated in relation to that of the polymer gel without surfactant.

TABLE V

| Surfactant which has been added to the polymer gel | % by weight of surfactant based on solids content of the polymer gel | Relative superficial extent of the polymer gel after pressing |
| --- | --- | --- |
| Genagen ® CA-050 | 0.3% by weight | 3.5 |
| DSIE adduct | 0.6% by weight | 2.8 |
| Hostapur ® SAS 30 | 0.2% by weight | 5.5 |
| SPAN ® 20 | 0.2% by weight | 4.8 |
| Sodium lauryl sulfate | 0.1% by weight | 3.9 |
| Ampholyt ® JB 130/K | 0.4% by weight | 2.2 |

From the data of Table V it is evident that the addition of surfactant to the polymer gel makes it possible to increase considerably the spreadability of the gel under compressive loading.

EXAMPLE VI

The solids content of the polymer gel of Comparison Example I is raised by admixing SAP fine grain, i.e. particles with a diameter of less than or equal to 0.150 mm. This is done by mixing 0.8 part of SAP fine grain, made up into a paste beforehand with 0.5 part of water, into 10 parts of polymer gel (22.5% by weight solids). The solids content of the polymer gel thus prepared is then 27.0% by weight. The gel is subsequently subjected to the press experiment described in Example V. In this experiment, the resulting gel film is found to have a relative superficial extent of 0.7.

These experiments are then repeated but with the addition of the amounts of surfactant indicated in Table VI to the water used to make up the SAP fine grain into a paste. In comparison with the fine-grain paste made with water without surfactant, it is much easier in these experiments to mix the fine grain into the polymer gel. The polymer gels thus prepared (all 27.0% by weight solids) are subjected to the press test, and the resulting relative superficial extents of the gel fims are indicated in Table VI.

TABLE VI

| Surfactant which together with SAP fine grain has been added to the polymer gel | % of weight of surfactant based on solids content of the polymer gel | Relative superficial extent of the gel after pressing |
|---|---|---|
| Plantaren ® 2 000 UNPN | 0.3% by weight | 2.8 |
| Tween ® 20 | 0.3% by weight | 3.2 |
| SPAN ® 80 | 0.4% by weight | 3.9 |
| Hostapur ® SAS 30 | 0.2% by weight | 3.5 |
| Disodium salt of ricinoleic acid monoethanolamido-sulfosuccinate | 0.4% by weight | 2.8 |
| $C_{12}$-/$C_{14\text{-alkybenzyl}}$-dimethyl-ammonium chloride | 0.6% by weight | 1.9 |

The results show that the addition of surfactant increases the spreadability of the polymer gel.

We claim:

1. A process for manufacturing hydrophilic swellable hydrogel product with reduced tendency toward gel blocking comprising:

initiating an aqueous solution polymerization of a hydrophilic monomer to form a first polymer hydrogel reaction product, treating a fine grain polymer hydrogel after polymerization with a surfactant in a treatment solution to form a treated fine grain polymer hydrogel wherein said fine grain polymer hydrogel has a particle size of less than or equal to 0.15 mm, comminuting said treated fine grain polymer hydrogel with said first polymer hydrogel reaction product to form a comminuted mixture, feeding said comminuted mixture to a contact dryer, spreading said comminuted mixture on a surface of said contact dryer, drying said comminuted mixture in said contact dryer to form a dried mixture, and removing said dried comminuted mixture from said surface of said contact dryer.

2. The process as claimed in claim 1, wherein said contact dryer operates at a contact surface temperature of at least 120° C.

3. The process as claimed in claim 1, wherein said contact dryer is a drum dryer.

4. The process as claimed in claim 1, wherein said drum dryer rotates at a speed of about 0.1 rpm to about 5 rpm.

5. The process as claimed in claim 1, wherein said first polymer hydrogel reaction product is a polymer comprising (co)polymerized hydrophilic monomer, graft (co)polymers of one or more hydrophilic monomers on a graft base, crosslinked cellulose ethers or starch ethers, or natural products, optionally swollen in aqueous liquids and optionally in chemically modified form.

6. The process as claimed in claim 5, wherein said hydrophilic monomer is a compound of the formula (I)

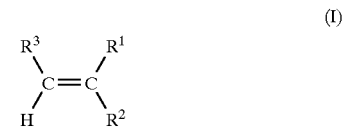

(I)

in which $R^1$ is hydrogen, methyl or ethyl, $R^2$ is the group —COOR$^4$, sulfonyl, phosphonyl, ($C_1$–C4)-alkanol-esterified phosphonyl, or a group of the formula

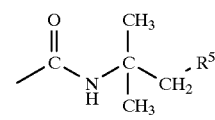

$R^3$ is hydrogen, methyl, ethyl or carboxyl, $R^4$ is hydrogen, amino or hydroxy-($C_1$–$C_4$)-alkyl, and $R^5$ is sulfonyl, phosphonyl or carboxyl.

7. The process as claimed in claim 6, wherein said hydrophilic monomer is acrylic acid or methacrylic acid.

8. The process as claimed in claim 1, wherein said comminuted mixture has a solids content of at least 50% by weight.

9. The process as claimed in claim 1, wherein said surfactant is selected from the group consisting of nonionic, anionic, cationic, and amphoteric surfactants.

10. The process as claimed in claim 1, wherein said surfactant has an HLB value of greater than or equal to three.

11. The process as claimed in claim 1, wherein said surfactant is present in an amount of from 0.01% to 5% by weight, based on the solids content of the comminuted mixture.

12. The process as claimed in claim 1, wherein said treatment solution comprises said surfactant and a crosslinker solution.

13. The process as claimed in claim 1, wherein said treatment solution comprises said surfactant and a sodium hydroxide solution.

* * * * *